TRIGONOMETRIC BRIDGE

Original Filed Feb. 25, 1965 3 Sheets-Sheet 1

INVENTOR
JOHN B. HEAVISIDE
BY
Morgan, Finnegan, Durham & Pine
ATTORNEYS

INVENTOR.
JOHN B. HEAVISIDE

BY

Morgan, Finnegan, Durham & Pine

ATTORNEYS

Sept. 8, 1970 J. B. HEAVISIDE 3,527,931

TRIGONOMETRIC BRIDGE

Original Filed Feb. 25, 1965 3 Sheets-Sheet 3

INVENTOR.
JOHN B. HEAVISIDE

BY

Morgan, Finnegan, Durham & Pine
ATTORNEYS

United States Patent Office 3,527,931
Patented Sept. 8, 1970

3,527,931
TRIGONOMETRIC BRIDGE

John B. Heaviside, Huntington, N.Y., assignor to North Atlantic Industries, Inc., Plainview, N.Y., a corporation of New York

Original application Feb. 25, 1965, Ser. No. 435,149, now Patent No. 3,366,804, dated Jan. 30, 1968. Divided and this application Jan. 11, 1968, Ser. No. 697,042
Int. Cl. G06g 7/22, 7/32
U.S. Cl. 235—179 16 Claims

ABSTRACT OF THE DISCLOSURE

A computing circuit for processing input complementary trigonometric functions defined by amplitude and angular data to derive an indication of the angular data. Complementary trigonometric functions of a trail angle are generated and products formed between these functions and the input trigonometric functions, the products being combined to derive a representation of the amplitude data and the representation combined with the products to derive an indication of the angular data.

This application is a division of applicant's prior copending application Ser. No. 435,149, filed Feb. 25, 1965, now Pat. 3,366,804, and also includes subject matter described in prior copending application Ser. No. 353,-558, filed Mar. 20, 1964, entitled Data Processing of which applicant is a co-inventor.

This invention relates to switching techniques employed in bridge circuits and to solid state switching of such arrangements.

Although solid state switching offers certain advantages over electro-mechanical arrangements, there are many applications where the solid state switch, although otherwise acceptable in terms of complexity, cost, and size, does not possess the requisite performance specifications to meet accuracy requirements.

For example, the dynamic impedance of a solid state diode employed as a switching element may be several ohms and may be as high as several hundred ohms. These impedances may be wholly unacceptable in many applications.

Although there are means for reducing this dynamic impedance, these means frequently result in an increase in cost and complexity to the point where it is more feasible to employ electro-mechanical switching arrangements.

It is accordingly one object of the invention to provide an improved solid state switching arrangement for bridge circuits characterized by an improvement in accuracy which is attained without a corresponding increase in size or complexity. It is a further object of the invention to provide improved control arrangements employing such solid state switches in combination with bridge circuits for effecting improvements in various data processing functions including logic operations and basic computations.

Other objects and advantages of the invention will be set forth in part hereinafter and in part will be obvious herefrom or may be learned by practice with the invention, the same being realized and attained by means of the instrumentalities, combinations and improvements herein shown, described and claimed.

Serving to illustrate exemplary embodiments of the invention are the drawings of which:

Figure 2:
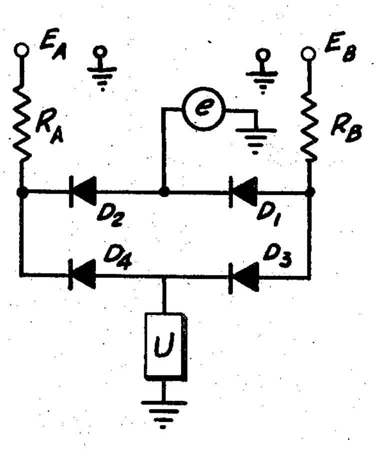
PRIOR ART FIG. 2
FIG. 2 is a schematic wiring diagram of a prior art diode switching circuit.

For the purpose of contrast, initial reference is to the circuit of FIG. 2 wherein there is illustrated a solid state diode bridge circuit employed for switching in accordance with prior art techniques.

The diode bridge is constituted with one branch of serially interconnected diodes $D_1$ and $D_2$ and another, shunt branch, formed of serially connected diodes $D_3$ and $D_4$. The cathode side of the bridge is connected via a resistor $R_A$ to switching voltage $E_A$; similarly, the anode side of the bridge is connected via a resistance $R_B$ to the switching voltage $E_B$.

The controlled or switched circuit includes a source of potential $e$ having one side connected to the common terminal, illustratively ground, and its other terminal connected to the junction of $D_1$ and $D_2$. The controlled circuit further includes an output or load circuit U which may be a utilization device, e.g., some circuit in a signal transmission path. Circuit U has one end connected to the junction of diodes $D_3$ and $D_4$ and its other terminal returned to the return or ground terminal.

In operation, voltages $E_A$, $E_B$ of the proper amplitude and opposite polarity are applied to the switching terminals causing the diodes $D_1$, $D_2$, $D_3$ and $D_4$ to become forwardly biased. As a result conduction is established between the source $e$ and the output circuit U thereby effecting the switching action.

A practical circuit of the type shown in FIG. 2 has a number of significant limitations. For one, the resistances $R_A$ and $R_B$ act as a load on the source $e$. The dynamic impedance of the diodes varies inversely with the diode current and since the diodes are effectively in series with the source and output circuit, it becomes necessary to keep the diode dynamic impedance at a sufficiently low value. To do this it is necessary to maintain a relatively high current through the diodes thereby necessitat- a minimization of the size of $R_A$ and $R_B$. This, however, as noted above, complicates the loading problem. Hence, the circuit requires a compromise of diverging criteria with an attendant limitation on performance.

Figure 1:
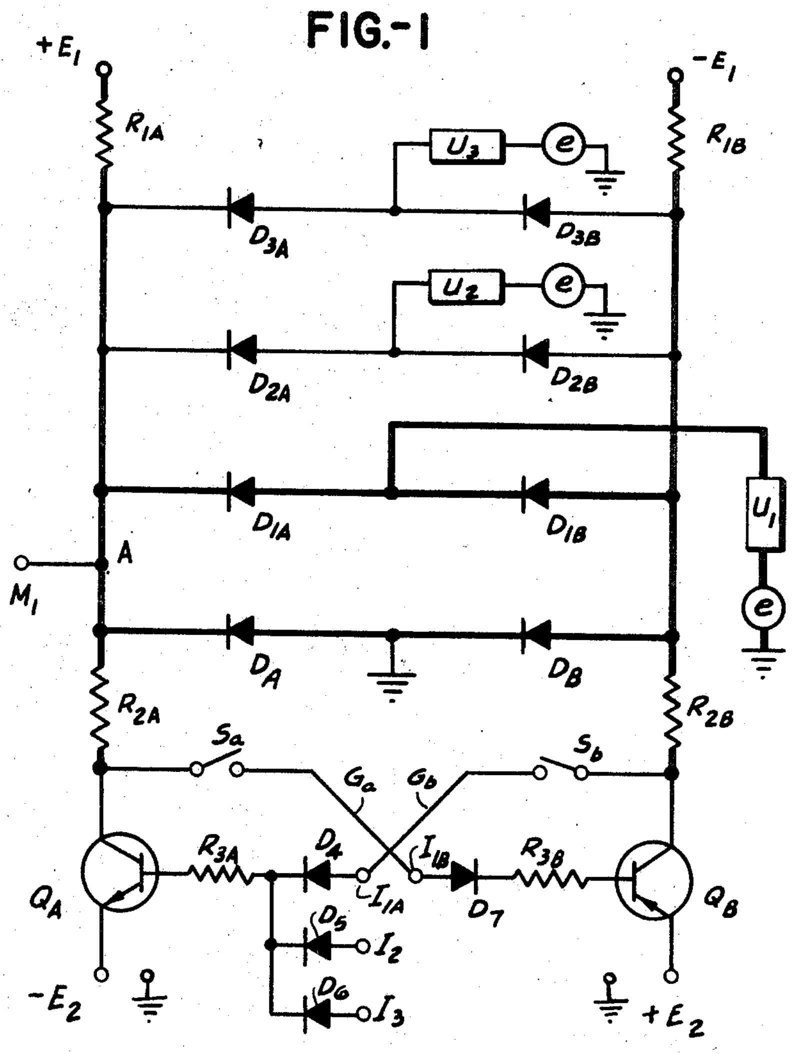
FIG. 1 is a schematic diagram of a switching arrangement according to the invention.

Certain of the disadvantages of FIG. 2 have been overcome by circuits according to the invention such as illustrated in FIG. 1. The main switching arrangement therein illustrated includes a diode bridge having one branch comprising serially interconnected diodes $D_A$ and $D_B$. The junction of these two diodes is connected to the common ground terminal. A parallel branch comprises serially interconnected diodes $D_{1A}$ and $D_{1B}$. The junction of $D_{1A}$ and $D_{1B}$ is connected to the circuit to be controlled, $U_1$, as well as to the switched voltage source $e$ connected in series with $U_1$. In practice and in certain applications it may be preferable to interchange the relative positions of source $e$ and switched circuit $U_1$. In either configuration, the switching bridge of FIG. 2 provides the common or reference terminal on one side of the bridge (schematically indicated with the ground terminal) and the circuit to be switched along with the source, on the other side of the bridge. Hence, when the bridge is switched *on*, the ground connection is supplied to the controlled circuit causing current flow therein. The ground connection may be by way of an impedance small enough to preclude deterioration in accuracy or interference with the control circuit. In view of this arrangement, the loading effect on the source provided by the resistors in the switch control circuit is eliminated. Furthermore, the forward switching voltage can be low in the circuit of FIG. 1 whereas in the prior art arrangement it must exceed the peak value of the signal source *e*.

The anode side of the switching bridge in FIG. 1 is connected to a first switching voltage $-E_1$ via a resistance $R_{1B}$. The anode side is also connected to a second switching voltage $+E_2$ via the series combination of resistance $R_{2B}$ and the collector-emitter circuit of a transistor driver $Q_B$. On the cathode side of the diode bridge there is an analogous connection to a switching voltage $+E_1$ via a resistance $R_{1A}$ and to a second switching voltage $-E_2$ via the series combination of resistance $R_{2A}$ and the collector-emitter circuit of a driver stage $Q_A$.

The switching voltages $+E_1$ and $-E_1$ are operative to back-bias the diode bridge to a sufficient degree to prevent conduction except under the conditions described hereinafter. In contrast with the arrangement of FIG. 2, the bridge is supplied with separate switching voltages $+E_2$ and $-E_2$ which are operative when applied to the bridge to cause conduction with a resultant switching of the output circuit. The voltages $\pm E_2$ may be relatively small compared with the amplitude of $E_1$ and in an illustrative application $E_2$ may be in the order of three volts while $E_1$ is thirty volts .

The base of $Q_A$ is connected via a resistance $R_{3A}$ and a diode $D_4$ to an input terminal $I_{1A}$. Similarly, the base of $Q_B$ is connected via the series combination of $R_{3B}$ and $D_7$ to terminal $I_{1B}$. With the circuit as thus far described, the application of a potential at $I_{1A}$ which is sufficient to forwardly bias $Q_A$ will cause the saturation of $Q_A$ and the resultant connection of the *on* voltage, $-E_2$, to the diode bridge via resistance $R_{2A}$. A similar voltage of opposite polarity applied to terminal $I_{1B}$ causes $Q_B$ to be switched *on* with the result that $+E_2$ is applied to the anode side of the bridge via $R_{2B}$. When these actions are accomplished, the bridge is rendered conductive, causing the switching circuit $U_1$, *e*, to be grounded and therefore completed.

It should be noted here that $Q_A$ and $Q_B$ are transistors of complementary types and are biased by $-E_2$ and $+E_2$ such that a voltage positive with respect to $-E_2$ (e.g., a ground or voltage of zero amplitude) can switch *on* $Q_A$ while a voltage negative relative to $+E_2$, which again can be the ground potential, can cause the switching *on* of $Q_B$. Alternatively, by proper selection of bias, base resistances and switching voltages, the switching levels for the A and B circuits can be made different to adapt the arrangement to logic operations employing multi-switching levels.

Since the forward switching voltage $\pm E_2$ may be comparatively low and since the resistances $R_{2A}$ and $R_{2B}$ do not load the switched circuit and thus may be of low value, there is less power required for switching a given amount of output power.

The circuit of FIG. 1 is amenable to a latching or memory type characteristic and to this end cross coupling circuits $G_a$ and $G_b$ may be employed, the former connecting the collector of $Q_A$ to input terminal $I_{1B}$ via a switch $S_a$ and the latter connecting the collector of $Q_B$ to input terminal $I_{1A}$ via a switch $S_b$.

Assuming both switches $S_a$, $S_b$ are closed, the circuit of FIG. 1 will latch *on* if a ground or other suitable potential is applied to either of the input terminals $I_a$ or $I_b$. In the absence of such a potential the circuit is maintained *off* because the collector of $Q_B$ is negative relative to the potential $-E_2$ while the collector of $Q_A$ is more positive than the potential $+E_2$. Once the circuit has been switched on (and assuming of course that switches $S_a$ and $S_b$ are closed), the circuit will stay in a conductive state even after the switching voltage is removed from terminal $I_{1a}$ or $I_{1b}$. This results from the relatively negative potential which is coupled from the collector of $Q_A$ to the base of $Q_B$ and because of the relatively positive potential which is coupled from the collector of $Q_B$ to the base of $Q_A$.

In certain applications it is desirable to have the capability of effecting switching at different control levels. This is accomplished in FIG. 1 by simply opening switch $S_a$ or $S_b$. When this is done the latching characteristic is eliminated but a choice of switching levels is made available. For example, and assuming that switch $S_a$ is open, a relatively negative potential applied at input terminal $I_{1B}$ causes $Q_B$ to be switched *on*. When this occurs a forward biasing potential is coupled from the collector of $Q_B$ to the base of $Q_A$ so that the entire bridge is switched *on*. If on the other hand $S_a$ is closed and $S_b$ is opened, a relatively positive potential at terminal $I_{1a}$ will switch the bridge into conduction.

The circuit of FIG. 1 is also particularly adapted to supply a monitoring signal or an auxiliary signal and this is advantageously attained from any one of several points including the junction A of FIG. 1 to which is connected an auxiliary output terminal $M_1$ useful for monitoring or other purposes.

Because of its performance characteristics and in view of the fact that it acts to complete a circuit to ground, the embodiment of FIG. 1 is also adapted to provide multi-pole operation. This is readily accomplished by connecting additional branches in parallel with the main bridge. Thus, as illustrated, an additional branch comprising serial diodes $D_{2A}$ and $D_{2B}$ may be connected in parallel with the bridge with the junction of $D_{2A}$ and $D_{2B}$ being connected to the switched circuit $U_2$ and its series source *e*. Similarly, an additional circuit $U_3$ and its source *e* may be switched by connecting the same to the junction in an additional branch comprising serially connected diodes $D_{3A}$ and $D_{3B}$.

The diodes $D_4$ and $D_7$ in the base circuits of $Q_A$ and $Q_B$, respectively, serve the function of preventing damage to the associated collector-base junction. In addition these diodes may be employed in combination with parallel input diodes to provide logic operations, for example, OR functions. Thus as illustrated in FIG. 1, the input $I_{1A}$ may be paralled by inputs $I_2$ and $I_3$ connected to $R_{3A}$ via respective diodes $D_5$ and $D_6$. The driver sections of FIG. 1 may thus be utilized to provide logic operations, a technique which is frequently not feasible in electro-mechanical relay circuits.

Because of its accuracy, the switching arrangement of FIG. 1 is particularly adapted for use in certain computing operations where high order accuracy is required. However, the switching device according to the invention functions to complete the ground circuit and for this reason its combination with other computation elements in some cases requires certain unique circuit configurations, certain of these arrangements are illustrated in FIGS. 3, 4, 5 and 6.

Figures 3, 4, 5:
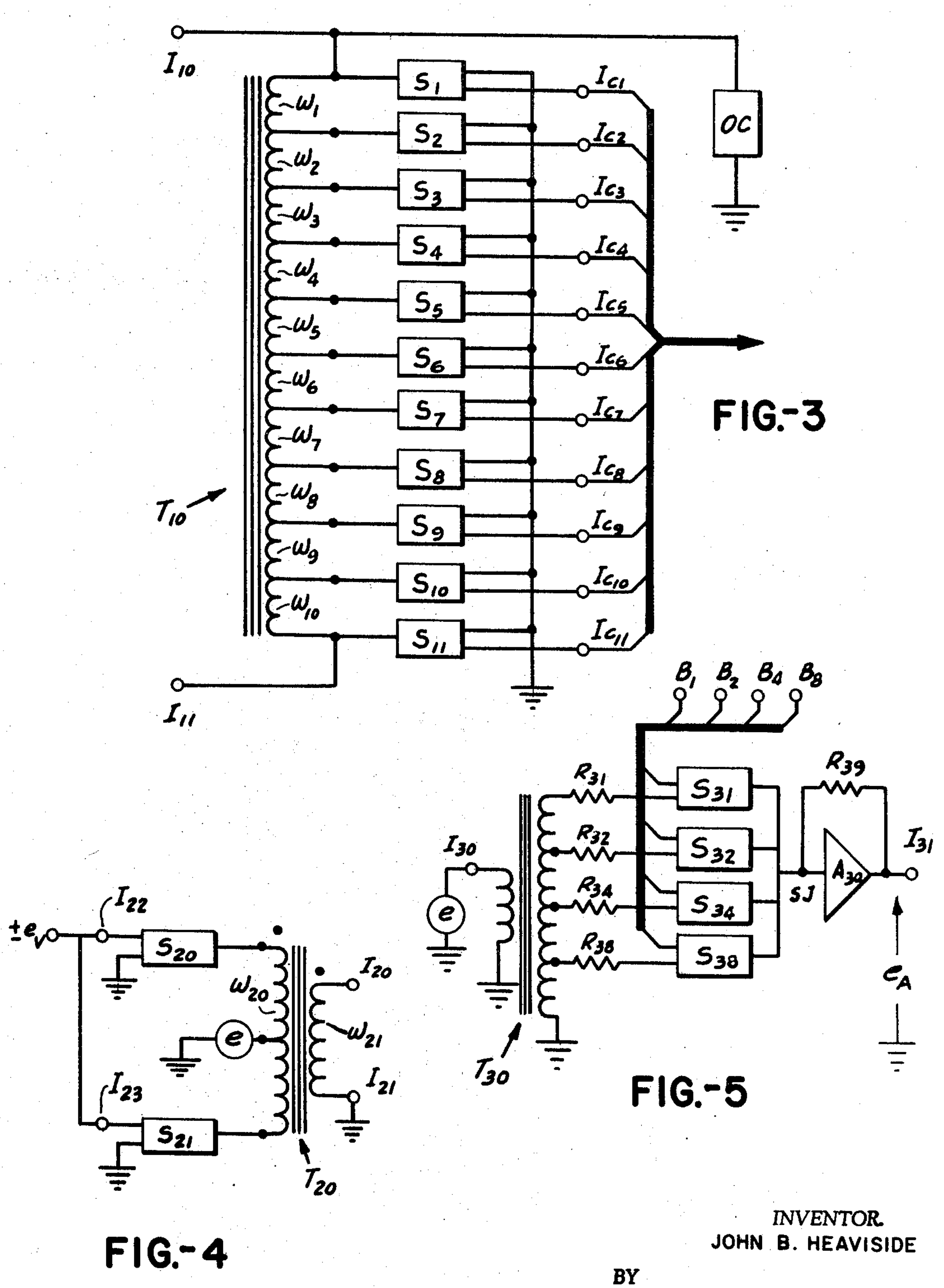
FIG. 3 is a schematic wiring diagram of an inductive divider controlled with the aid of switching devices such as those illustrated in FIG. 1.
FIG. 4 is a schematic diagram illustrating the switching arrangement of FIG. 1 in a combination providing an inversion operation.
FIG. 5 is a schematic diagram illustrating the switching techniques of FIG. 1 in a circuit for converting digital inputs to analogue outputs.

Illustrated in FIG. 3 is an inductive divider such as used in data processing, e.g., in precision ratiometric measurement of AC voltages. The divider comprises a transformer $T_{10}$ having a plurality of spaced winding taps connected to define individual winding sections, $W_1$, $W_2$, $W_3$, . . . $W_{10}$. In the illustration, the complete winding is of the decade type and each section has its tap connected to a respective switching circuit $S_1$, $S_2$, $S_3$ . . . $S_{11}$. These switching circuits are as illustrated in FIG. 1 (with the additional switching circuits $D_{2A}$–$D_{2B}$ and $D_{3A}$–$D_{3B}$ not utilized). The output terminal of each of the switching circuits $S_1$, $S_2$ . . . $S_{11}$ is connected to ground such that the application of a suitable voltage to the respective control terminal $I_{c1}$, $I_{c2}$, $I_{c3}$ . . . $I_{c11}$, connects the tap associated therewith to ground. This tap grounding action is different from the usual tap selection arrangements found in inductive dividers and to make this action effective, the upper terminal of the divider is connected to the succeeding circuit OC which may comprise an output or additional interpolating windings on the same or a different core. The input voltage is applied to terminals $I_{10}$ and $I_{11}$ connected across the entire divider.

It may be seen that the closure of any of the switches $S_1$, $S_2$ . . . $S_{11}$ by application of an *on* signal at the respective terminal $I_{c1}$, $I_{c2}$ . . . $I_{c11}$ results in a grounding of the corresponding tap with the result that all sections below that point do not make any contribution to the resultant output which is developed across the taps above that point and which is connected with the output circuit OC. The switches will each have an appropriate one of the cross couplings $G_a$ or $G_b$ conductive so that the appropriate polarity voltage will cause switch *on* while the opposite causes switch *off*. However, with certain logic circuits it may be preferable to employ the switches with their latching characteristic.

For accomplishing inversion functions with the switch of FIG. 1 circuits may be employed such as illustrated in FIG. 4. As seen therein a transformer $T_{20}$ has the two outside terminals of its primary connected to ground via respective switches $S_{20}$ and $S_{21}$ of the type such as shown in FIG. 1 with one switch, e.g., $S_{20}$, having the cross circuit $G_a$ complete while $S_{21}$ has the opposite coupling $G_b$ completed. The center tap of the primary winding, $W_{20}$, is connected to the signal source, *e*, the other terminal which is grounded. The transformer secondary comprises a winding $W_{21}$ having output terminals $I_{20}$ and $I_{21}$. A signal voltage $e_v$ of selected polarity is applied to the control termins $I_{22}$, $I_{23}$ of the switches.

It may be seen that the transformer will execute a phase reversal when the states of switches $S_{20}$ and $S_{21}$ are reversed. Thus, with $S_{20}$ *on* and $S_{21}$ *off*, e.g., as will occur when signal voltage $e_v$ is positive, the output voltage at terminal $I_{20}$ is out of phase with the voltage *e*. When $S_{21}$ is switched *on* and $S_{20}$ switched *off*, the voltage *e* and the output voltage at $I_{20}$ are in phase.

The switching circuits according to the invention are adapted to perform certain binary-digital conversion techniques, one of which is illustrated in FIG. 5. The circuit therein converts a digital input applied at terminals $B_1$, $B_2$, $B_4$ and $B_8$ into a corresponding analogue voltage, $e_A$, which appears at output terminal $I_{31}$.

In implementing the foregoing, a voltage *e* is applied via a terminal $I_{30}$ to the primary winding of a transformer $T_{30}$. The transformer secondary is tapped and supplies properly weighted proportions of the voltage *e* to each of the four summing branches of the converter. A first branch comprises the serial combination of resistance $R_{31}$ and switch $S_{31}$; this branch is connected to the top of the transformer secondary. Receiving a reduced potential is the similar series branch comprising resistor $R_{32}$ and switching cicuit $S_{32}$. Successively lower potentials are applied to the third and fourth branches comprising $R_{34}/S_{34}$ and $R_{38}/S_{38}$.

Although proper weighting of the inputs may be accomplished by an appropriate proportioning of the resistors $R_{31}$, $R_{32}$, $R_{34}$ and $R_{38}$, there is an advantage in weighting the voltages prior to application to the respective branches. In this arrangement the resistors $R_{31}$, $R_{32}$, $R_{34}$ and $R_{38}$ may be all of the same size so that with their respective stray capacitances, the phase shift in each branch is substantially equal.

The output sides of the branches are all connected together at a summing junction SJ of an amplifier $A_{30}$. Across the amplifier is feedback resistor $R_{39}$ while the amplifier output is connected to output terminal $I_{31}$.

The switches $S_{31}$, $S_{32}$, $S_{34}$ and $S_{38}$ are controlled according to the digital inputs supplied at respective control terminals $B_1$, $B_2$, $B_4$ and $B_8$. By switching the switching circuits *on* individually and in suitable combinations, various net digital states of the amplifier can be established and proportional analogue voltages thereby developed at the output terminal. For example a switching signal on terminals $B_1$ and $B_4$, representing the quantity 10 for example, will cause the respective switches $S_{31}$ and $S_{34}$ to be switched *on*. As a consequence the branches containing $R_{31}$ and $R_{34}$ are connected to the summing junction SJ with the effect that the amplifier has a gain proportional to the illustrated digital input of 10. When $B_2$ and $B_3$ are energized, the corresponding branches $R_{32}$ and $R_{38}$ are rendered effective so that the amplifier in effect provides a sum proportional to the digital input (5), i.e., provides a corresponding analogue voltage which appears at the output. It may be noted that the low switching impedance of the switching circuits $S_{31}$, $S_{32}$, $S_{34}$ and $S_{38}$ is especially advantageous in the circuit of FIG. 5 where the switch outputs are connected to the virtual ground of the summing junction with their negligible impedances inserted in each of the summing branches in series with the input resistors.

Figure 6:
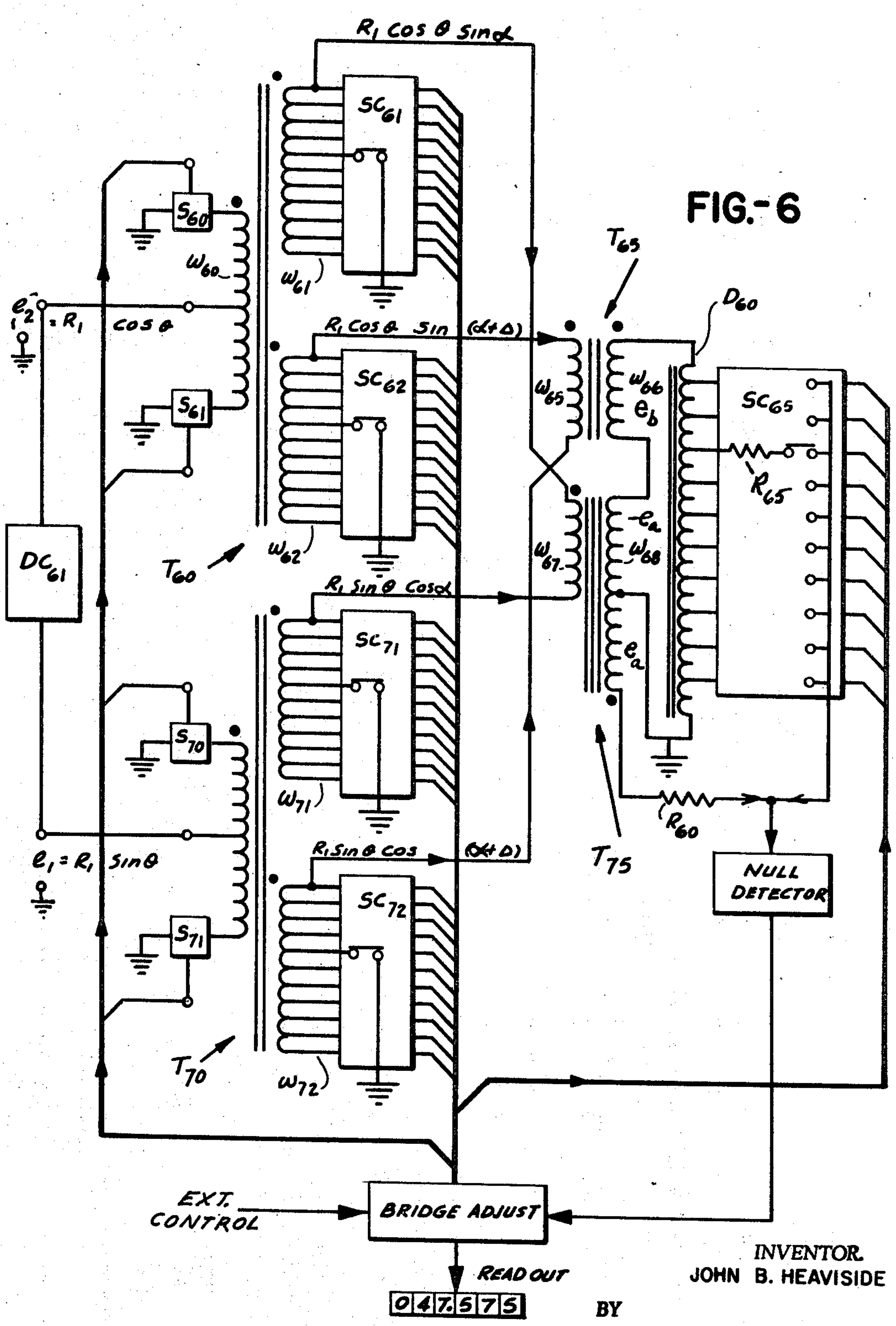
FIG. 6 is a schematic diagram of a resolver bridge employing switching techniques according to the invention.

In FIG. 6 there is illustrated a resolver bridge system employing the switching arrangements according to the invention including the phase inversion technique as illustrated in FIG. 4 and the inductive divider switching technique shown in FIG. 3. In general organization the bridge system of FIG. 6 is similar to that disclosed in copending application, Ser. No. 353,558, filed Mar. 20, 1964 Computer Circuits for PROCESSING trigonometric Data, of which the applicant is co-inventor and which is assigned to the assignee of the instant application.

The input of FIG. 6 comprises the resolver voltages $e_1$ and $e_2$, the former representing the sine component and the latter the cosine component. These voltages may initially be in the form of synchro data which are converted to resolver form by way of the converted $DC_{61}$. Examples of such converters are illustrated and described in the above-mentioned copending application. Alternatively, the data may be of resolver type in origin.

Voltage $e_1$ is applied to the primary winding of a transformer $T_{70}$ while voltage $e_2$ is similarly applied to the primary of a transformer $T_{60}$. The voltages are each applied to the center tap of the respective primary and the outside terminals of both windings are provided with solid state switches such as those described and illustrated in FIG. 1. It may be seen that the primary of each transformer is instrumented to effect phase reversal in accordance with the switching of the switch pairs $S_{60}/S_{61}$, in the case of $T_{60}$, and $S_{70}/S_{71}$ in the case of transformer $T_{70}$. These switches are actuated by electrical signals generated by the bridge adjust, following the reversal techniques described in the aforesaid copending application.

The secondary of transformer $T_{60}$ consists of two separate inductive dividers each tapped to yield values of sine/cosine increments, D, of 10 degrees. It should of course be understood that other increments may be used. Each tap is connected to a respective switch of the type illustrated in FIG. 1 with the switch functioning to ground the respective tap when the switch is rendered conductive by the appropriate control signal. This arrangement is symbolized by the block labeled $SC_{61}$, one of the switches being schematically indicated in the closed state whereupon its associated tap connection is grounded. A similar arrangement characterizes the switching circuits connected to the winding $W_{62}$ of $T_{60}$, this being shown schematically by the block labeled $SC_{62}$.

The switching of the circuits in $SC_{61}$ and $SC_{62}$ are coordinated such that the adjustment of the bridge to an angle $\alpha_1$ causes that tap to be selected in $SC_{61}$ which yields the sine of $\alpha_1$ at the output terminal of $W_{61}$ and causes that tap to be selected in $SC_{62}$ which yields at the output terminal of $W_{62}$ the sine of $(\alpha_1+D)$. Of course it should be borne in mind that the outputs from both windings are multiplied by a voltage related to cosine $\theta$.

A similar arrangement characterizes the two secondary windings $W_{71}$ and $W_{72}$ of transformer $T_{70}$. The switching in $SC_{71}$ is such that the output includes the factor cosine $\alpha$ while the switching in $SC_{72}$ yields the cosine of $(\alpha+D)$.

The value of D in degrees is the same as the size of each divider increment.

The resultant four outputs are applied to combining means embodied as a transformer $T_{65}$ and a transformer $T_{75}$. The primary winding $W_{65}$ of transformer $T_{65}$ is energized by the combination of signals appearing at the outputs of windings $W_{62}$ and $W_{72}$. The primary winding $W_{67}$ of transformer $T_{75}$ is energized by the combination of signals developed at windings $W_{61}$ and $W_{71}$. This computing operation is similar to that described in the aforesaid copending application.

The output signals developed across the secondaries of transformers $T_{65}$ and $T_{75}$ are combined in the manner shown with one terminal of $W_{66}$ and the center tap of $W_{68}$ being connected across an inductive divider $D_{60}$. The other end terminal of $W_{66}$ and one end terminal of $W_{68}$ are connected together while the other end terminal of $W_{68}$ is connected via a resistance $R_{60}$ to the common switched terminals of a plurality of solid state switches, $SC_{65}$, each of which is connected to a respective tap on $D_{60}$. The junction of resistance $R_{60}$ and this common terminal is connected to a null detector which is responsive to the condition of balance or unbalance in the bridge. Divider $D_{60}$ and the associated switches $SC_{65}$ function as an interpolating arrangement for interpolating the relatively coarse adjustment of the bridge at the input dividers $T_{60}$ and $T_{70}$. The adjustment of switches in $SC_{65}$ is coordinated with the adjustment of the switching networks $SC_{61}$, $SC_{62}$, $SC_{71}$ and $SC_{72}$.

The voltage $e_a$ across $W_{68}$ is combined with $e$ across $W_{66}$. In the illustrated case $e_a$ is substracted from $e_b$ and the resultant voltage $e_r$ applied to the divider to produce a fraction of $e_r$, i.e., a net signal $ke_r$.

The output circuit of FIG. 6 is in essence a form of summing circuit such as shown in FIG. 5 in which currents are summed. The current flowing through $R_{60}$ is a function of $e_a$ while the current flowing out of the switch network is a function of $ke_r$. The summing junction is effectively at a ground potential because of the feedback effect involving the whole bridge.

The bridge may be of the automatic type as described in the aforesaid copending application, i.e., with the bridge adjustment controlled by way of feedback from the null detector or with the bridge adjustment effected independently thereof with the null detector employed to provide read-out or storage of that adjustment angle which yields a null. Alternatively the bridge may be completely manual with the null detector isolated from the bridge adjust and read-out circuits.

The invention is not limited to the specific mechanisms shown and described since modifications will undoubtedly occur to those skilled in the art. Changes may be made within the scope of the accompanying claims without departing from the spirit and chief advantages of the invention.

What is claimed is:

1. A trigonometric bridge for processing first and second complementary input trigonometric functions defined by amplitude and angular data comprising:
 bridge adjust means for providing first and second complementary adjusting functions;
 first and second computing means each having taps and each including switching means, for producing product functions of said input trigonometric functions and said adjusting functions,
  said first and second computing means being respectively operably connected to and energized by said first and second input trigonometric functions.
  said first and second computing means being operably connected to said bridge adjust means for respectively selectively grounding said taps of said first and second computing means by said switching means in accordance with said first and second adjusting functions for producing as outputs said product functions;
 interpolating means operably connected to said computing means and responsive to said output product functions for deriving a first signal proportional to said amplitude data; and
 means operably connected to said interpolating means and to said computing means and responsive to said first signal and to said output product functions for developing an indication of said angular data.

2. A bridge according to claim 1 in which
 said means connected to said interpolating means and said computing means includes null detector means responsive to said interpolating means and having a virtual ground point, and
 said interpolating means comprise a tapped divider having third switch means coupled between said taps and said virtual ground point.

3. A bridge according to claim 1 in which said interpolating means comprise a compensated interpolator.

4. A trigonometric bridge for processing first and second complementary input trigonometric functions defined by amplitude data and angular data $\theta$ comprising:
 bridge adjust means for providing first and second complementary adjusting functions of angular data $\alpha$;
 first and second computing means each having taps and each including switching means, for producing product functions of said input trigonometric functions of $\theta$ and said adjusting functions of $\alpha$,
  said first and second computing means being respectively operably connected to and energized by said first and second input trigonometric functions of $\theta$,
  said first and second computing means being operably connected to said bridge adjust means for respectively selectively grounding said taps of said first and second computing means by said switching means in accordance with said first and second adjusting functions of $\alpha$ for producing as output said product functions;
 means operably connected to said first and second computing means and responsive to said output product functions for
  deriving a first signal which is a function of $(\theta-\alpha)$ and said amplitude data of said functions of $\theta$ but is independent of the individual magnitudes of $\theta$ and $\alpha$, and
  deriving a second signal which is approximately proportional to said amplitude data; and
 combining means responsive to said derived signals for computing the value of said derived signals to compute $(\theta-\alpha)$ and thereby obtain an output indicative of $\theta$.

5. A bridge as defined in claim 4 in which said combining means include ratio computing means having taps and ground switching means for adjusting said ratio computing means in accordance with a function of $(\theta-\alpha)$.

6. A bridge as defined in claim 5 in which said ground switching means comprise diode bridge means; said diode bridge means comprising two diagonal signal junctions, one of which is grounded and the other of which is connected to said respective tap of said ratio computing means, a control circuit interconnecting diagonally opposite control junctions of said diode bridge for turning the bridge on and off, a forward biasing potential source in said control circuit having one terminal connected to ground, and means in said control circuit for effectively connecting said forward biasing source to said diode bridge to turn same on for grounding said tap.

7. A bridge as defined in claim 4 in which said first and second computing means comprise trigonometric ratio dividers;
 said means for deriving said first signal comprise summing means.

8. A trigonometric bridge for processing first and second complementary input trigonometric functions defined by amplitude and angular data comprising:

bridge adjust means for providing first and second complementary adjusting functions;

first and second computing means each having taps and each including switching means, for producing product functions of said input trigonometric functions and said adjusting functions, said first and second computing means being respectively operably connected to and energized by said first and second input trigonometric functions, said first and second computing means being operably connected to said bridge adjust means for respectively selectively grounding said taps of said first and second computing means by said switching means in accordance with said first and second adjusting functions for producing as outputs said product functions;

interpolating means operably connected to said computing means and responsive to said output product functions for deriving a first signal proportional to said amplitude data;

null detecting means operably connected to said interpolating means and to said computing means and responsive to said output product functions and said first signal for developing an indication of said angular data; and feedback control means operably connecting said null detecting means and said bridge adjust means for altering said first and second adjusting functions in accordance with said indication.

9. A bridge as defined in claim 8 in which said null detector means has a virtual ground point, and said interpolating means comprise a tapped divider having third switch means coupled between said taps and said virtual ground point.

10. A bridge as defined in claim 8 in which said tapped computing means each comprise trigonometric inductive dividers tapped to provide a plurality of sine/cosine values corresponding to a set of adjustment angles.

11. A bridge as defined in claim 8 in which said interpolating means comprise a compensated interpolator.

12. A bridge as defined in claim 8 in which said switching means comprise diode bridge means; said diode bridge means comprising two diagonal signal junctions one of which is grounded and the other of which is connected to the respective tap of the respective computing means, a control circuit interconnecting diagonally opposite control junctions of said diode bridge for turning the bridge on and off, a forward biasing potential source in said control circuit having one terminal connected to ground, and means in said control circuit for effectively connecting said forward biasing source to said diode bridge to turn same on for grounding said tap.

13. A trigonometric bridge for processing first and second complementary input trigonometric functions defined by amplitude data and angular data $\theta$ comprising:

bridge adjust means for providing first and second complementary adjusting functions of angular data $\alpha$;

first and second computing means each having taps and each including switching means, for producing product functions of said input trigonometric functions of $\theta$ and said adjusting functions of $\alpha$.

said first and second computing means being respectively operably connected to and energized by said first and second input trigonometric functions of $\theta$, said first and second computing means being operably connected to said bridge adjust means for respectively selectively grounding said taps of said first and second computing means by said switching means in accordance with said first and second adjusting functions of $\alpha$ for producing as outputs said product functions;

means operably connected to said first and second computing means and responsive to said products for deriving a first signal which is a function of $(\theta-\alpha)$ and said amplitude data of said first and second functions of $\theta$ but is independent of the individual magnitudes of $\theta$ and $\alpha$; and deriving a second signal which is approximately proportioned to said amplitude data; and combining means responsive to said derived signals for computing the value of said derived signals to compute $(\theta-\alpha)$ and thereby obtain an output indicative of $\theta$; and feedback control means operably connected to said combining means and said bridge adjust means for altering said first and second adjusting functions of $\alpha$ in accordance with said output.

14. A bridge as defined in claim 13 in which said first and second computing means comprise trigonometric ratio dividers;

said means for deriving a first signal comprise summing means; and said combining means are connected to be responsive to said summing means for computing $(\theta-\alpha)$.

15. A bridge as defined in claim 13 in which said combining means include ratio computing means and ground switching means for adjusting said ratio computing means in accordance with a function of $(\theta-\alpha)$ to compute said ratio.

16. A bridge as defined in claim 13 in which said switchin gmeans comprise diode bridge means; said diode bridge means comprising two diagonal signal junctions one of which is grounded and the other of which is connected to the respective tap of the respective computing means, a control circuit interconnecting diagonally opposite control junctions of said diode bridge for turning the bridge on and off, a forward biasing potential source in said control circuit having one terminal connected to ground, and means in said control circuit for effectively connecting said forward biasing source to said diode bridge to turn same on for grounding said tap.

References Cited

UNITED STATES PATENTS

| | | | |
|---|---|---|---|
| 3,071,324 | 1/1963 | Schroeder et al. | 235—186 X |
| 3,205,492 | 9/1965 | Young et al. | 340—347 |
| 3,277,461 | 10/1966 | Selvin | 340—347 |

EUGENE G. BOTZ, Primary Examiner

F. D. GRUBER, Assistant Examiner

U.S. Cl. X.R.

235—186, 195; 323—44.5